United States Patent [19]

Steinwandel et al.

[11] Patent Number: 4,929,581

[45] Date of Patent: May 29, 1990

[54] CATALYTIC DIESEL SOOT FILTER

[75] Inventors: Juergen Steinwandel; Juergen Haas; Carsten Plog, all of Markdorf, Fed. Rep. of Germany

[73] Assignee: Dornier-System GmbH, Friedrichshafen, Fed. Rep. of Germany

[21] Appl. No.: 194,606

[22] Filed: May 16, 1988

[30] Foreign Application Priority Data

May 16, 1987 [DE] Fed. Rep. of Germany ....... 3716446

[51] Int. Cl.$^5$ .......................... B01J 29/22; B01J 35/04
[52] U.S. Cl. ............................. 502/2; 502/78; 60/299; 123/569; 423/213.5
[58] Field of Search ................. 423/247, 213.5, 213.2; 502/2, 78; 60/299, 300; 123/569

[56] References Cited

U.S. PATENT DOCUMENTS

| 3,185,540 | 5/1965 | Breck | 423/247 |
|---|---|---|---|
| 3,476,508 | 11/1969 | Kearby et al. | 423/247 |
| 3,540,838 | 11/1970 | Reitmeier et al. | 423/247 |
| 3,565,574 | 2/1971 | Kearby et al. | |
| 3,607,133 | 9/1971 | Hirao | 60/299 |
| 3,684,743 | 8/1972 | Morotsky et al. | 502/2 |
| 3,855,389 | 12/1974 | Klimisch | 423/213.5 |
| 4,053,556 | 10/1977 | Acres | 423/247 |
| 4,319,896 | 3/1982 | Sweeney | 60/300 |
| 4,631,076 | 12/1986 | Kurihara et al. | 60/299 |

FOREIGN PATENT DOCUMENTS

| 54948 | 5/1981 | Japan | 123/569 |
|---|---|---|---|
| 2020613 | 1/1987 | Japan | 423/213.2 |
| 2114657 | 5/1987 | Japan | 502/78 |

*Primary Examiner*—Carl F. Dees
*Attorney, Agent, or Firm*—Ralf H. Siegemund

[57] ABSTRACT

Subject of the invention is a diesel-soot filter with catalytically-active coating for reducing the ignition temperature of the diesel-soot deposited on a filter, the active substance of the coating being a metal-doped zeolite.

11 Claims, 2 Drawing Sheets

CATALYTIC DIESEL SOOT FILTER

BACKGROUND OF THE INVENTION

The present invention relates to a dieselsoot filter with a catalytically active coating. The active substance of the coating is to be comprised of metal doped zeolite.

Exhaust fumes of Diesel engines usually contain contaminants. The emission of carbon monoxide and hydrocarbon is lower in Diesel engines owing to the excess of air, than the in case of an otto motor. On the other hand, the NOX discharge is in the range of admissable limits. A large problem relating to the ecology is the emission of soot particles by a diesel engine. Since diesel soot is actually a health hazard, owing to its content of higher molecular hydrocarbon or poly-condensed aromates, and since one can actually call those contaminates outright carcenogenic (content of 3.4 benzpyrene and nitroaromates) it is desirable to provide suitable technical steps for reducing the emission in the diesel exhaust fumes.

Prior experience has shown that engine engineering features by themselves are insufficient to obtain a significant reduction in soot emission. It has been tried, for example, to limit the soot emission through the installation of a filter into the exhaust channel, as shown, for example, in U.S. Pat. No. 4,329,162. By virtue of the soot collection process, the filter clogs with time, thus increasing the ram pressure in the exhaust system, thereby in turn reducing the engine power. It is, therefore, necessary, from time to time, to regenerate the filter by way of combustion of the soot. A thermal oxidation of the soot, however, occurs only at temperatures which are usually not obtained by diesel exhaust gases.

U.S. Pat. No. 4319869 describes supplemental heating of the filter as a possibility to support the ignition of the diesel soot on the filter. This, however, is an added complication of the system and leads ultimately to a higher energy consumption. The same is true for adding combustion aids into the combustion gas.

Using a catalyst is the most promising aspect for technical realization of reducing the ignition temperature of the soot on the filter. Catalysts of this kind are described for example in German printed patent applications 2,951,316 or 3,141,713 or European patent application 0,160,482. The use of a mixed oxide catalyst, indeed, decreases the ignition temperature of the soot, but a cleaning of the filter still will require temperatures which are simply unrealistic.

DESCRIPTION OF THE INVENTION

It is an object of the present invention to provide a new and improved coating material in filters which reduces the ignition temperature of soot and provides for continuous cleaning through oxidation of the diesel soot.

It was found that the ignition temperature of diesel soot on a filter can be reduced through a coating of a catalytically highly active material such that a regeneration obtains during normal driving. The catalycally active material in accordance with the invention includes a noble metal of the platinum group in a highly distributed state so that the requisite noble metal amounts for obtaining a low ignition temperature is still very low. The high and extensive distribution pattern of the noble metal amount obtains through doping a zeolite base body with a noble metal of the platinum group.

An object of the invention is furthermore a catalytically active coating for diesel filters for purposes of reducing the ignition temperature for diesel soot on the filter. The invention is characterized by the fact that the catalytically active substance consists of a metal-doped zeolite. Within the frame of the invention all temperature-resistant zeolites are usable. The metal component is comprised, as stated, essentially of a metal of the pertinum-platinum group. In addition, one may use certains metals of in the zeolite of the side-groups 1,2,5 6 or 7 of the periodic table or a combination thereof.

The doping of a zeolite from the mordenite group with platinum and nickel was found to be particularly favorable for reducing the ignition temperature, the atomic ratio of platinum to nickel being within the range between one to 20 and 20 to 1. The zeolite provides a particularly high distribution of the active component so that a high catalytic activity obtains with a small amount of noble metal.

In order to obtain a filter effect, the inventive catalytic mass should be deposited on a structural amplifyer. For this, all known filter elements such as packings of mineral or metal wools, ceramic foam or monolithic honeycomb elements are suitable. Particularly suitable is a monolithic cordierite honeycomb body with alternatingly plugged channels as shown and to be described more fully below with reference to FIG. 2.

The effect of the catalytic diesel soot filter can be enhanced by providing, prior to the depositing of the catalytically active mass an inner ceramic material of aluminum, silicon, titanium or zirconium oxide, or a combination of these materials to be deposited on the filter, or the catalycally-active nass is diluted upon being applied with such a particular material.

DESCRIPTION OF THE DRAWINGS

While the specification concludes with claims particularly pointing out and distincly claiming the subject matter which is regarded as the invention, it is believed that the invention, the objects and features of the invention, and further objects, features advantages thereof will be better understood from the following description taken in connection with the accompanying drawings in which:

The invention will in the following be explained more fully on the basis of the examples and these drawings.

Figure 1:
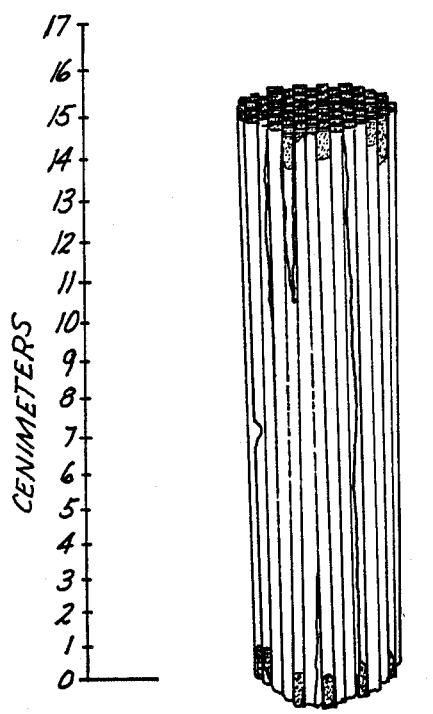
FIGS. 1 and 2 are perspective views with a scale added, of filters incorporating the preferred embodiment of the invention.

FIG. 1 shows a cordierite honeycomb body having the usual section of a honeycomb body of cordierite as used in laboratories for testing three-way calalyst.

Figure 2:
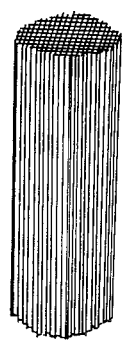

FIG. 2 shows a diesel-particle, particularly a section of a diesel-particle filter of cordierite with alternatingly-plugged channels so that the exhaust gasses are forced to flow through the ceramic wall while retaining the diesel soot.

Figure 3:
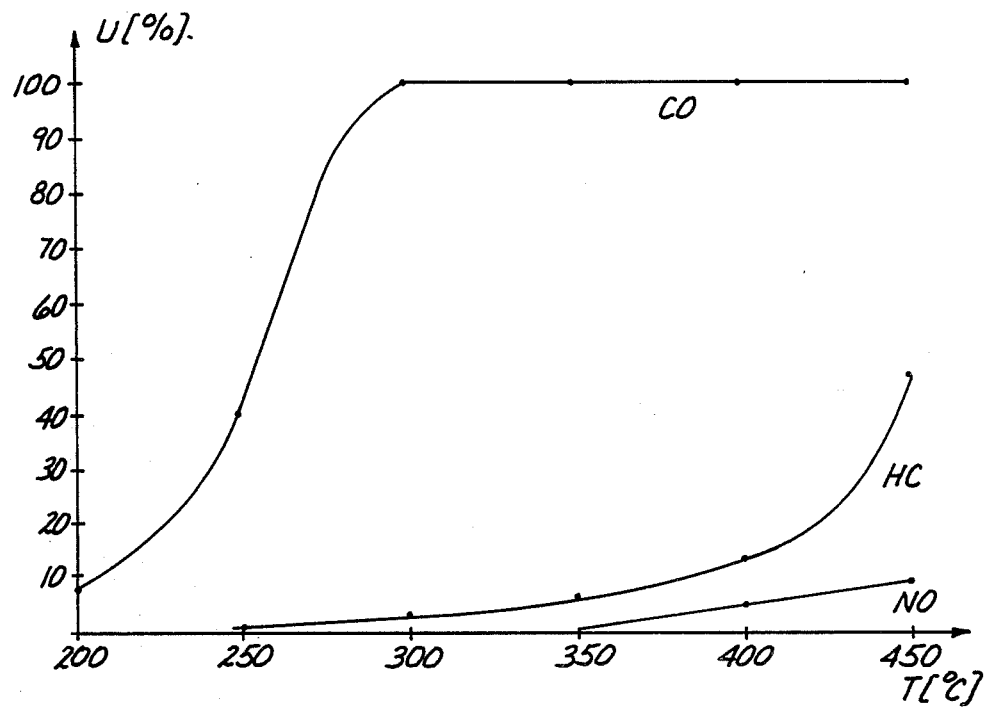

FIG. 3 is a diagram for showing soot conversion in a catalytically-coated honeycomnb body, to be compared with a filter one which is not coated. As a comparison, the $CO_2$ amount resulting from soot combustion was selected in VPPM units. There is plotted the difference in the amount of $CO_2$ as between coated and uncoated carriers. For uncoated honeycomb bodies, no soot conversion was observed up to temperatures of 450 C. while the catalyic coating in accordance with example 4 (infra) which was used a as coating on the filter, reduces that combustion temerature to about 250 C. and $CO_2$ development is observable resulting from burning soot.

Figure 4:
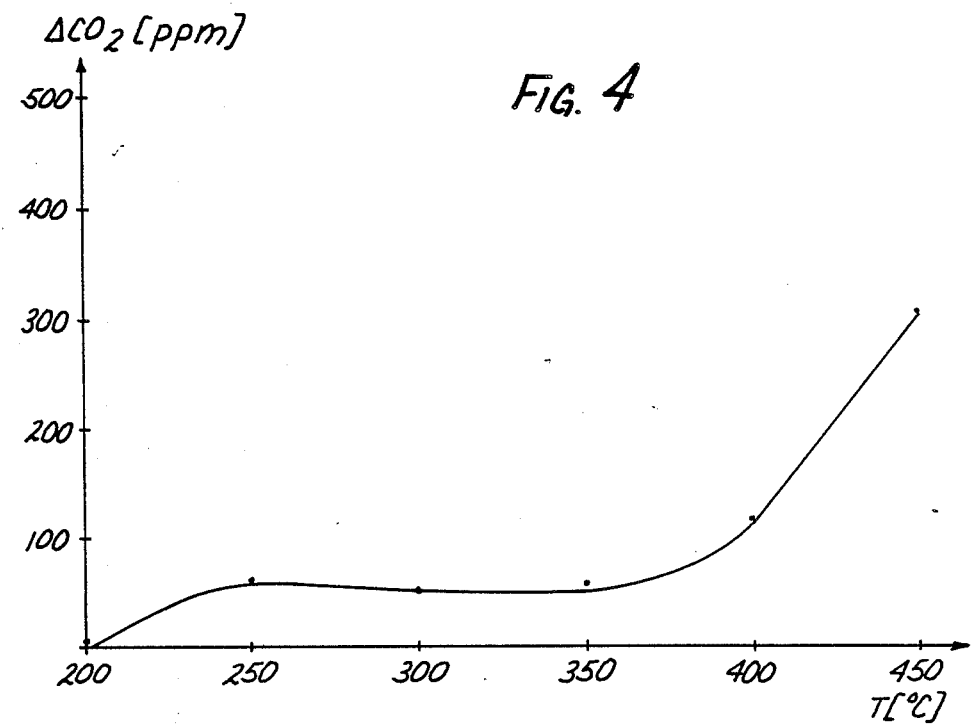

FIG. 4 is a diagram that shows a conversion of all gaseous contaminants, in percentages of the catalytically-coated honeycomb body. The pictures clearly shows the complete CO conversion, already at temperatures of 300 C. Propane was converted to a noticeable degree only at temperatures above 400 degrees C. Above that temperature there was also observed the conversion of NO.

Figure 5:
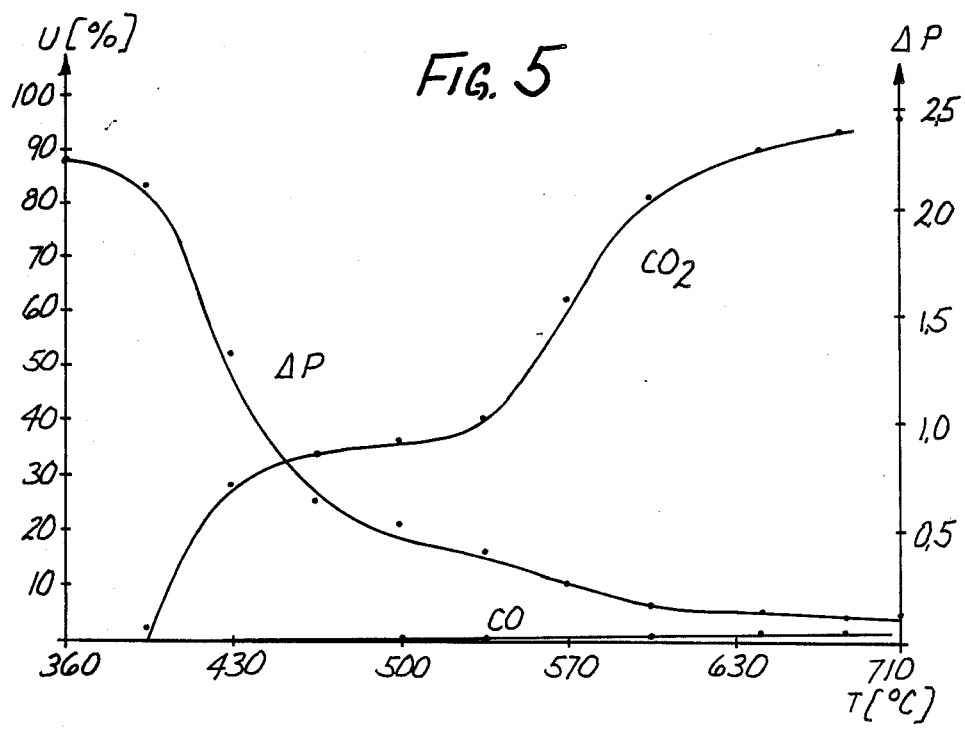
FIGS. 3, 4 and 5 are diagrams for explaining the invention.

FIG. 5 is a diagram which shows the conversion in percentages of pressure loss in bars of the catalytically-coated diesel soot filter. The diagram proves that the catalytically-active coating of the soot filter provides for an initiating soot-burning already at temperatures beginning at 420 degrees C. At 430 degrees C. about 25% of the soot is burned off, thus reducing the pressure loss in the filter from 2.2 bars down to 0.7 bars. Another considerable feature of the catalytically-active coating in accordance with example 5 (infra) is the fact that the soot is almost ezxclusively burned to $CO_2$.

Example 1: Production of a catalytically-active substance. 30 mml of a solution of $PT(NH_3)_4CL_2H_2O$ at a concentration of 20 grams Pt/liter was combined with up to 20 grams of NaY-zeolith and 20 ml of $H_2O$. The suspension was stirred for 24 hours in an Erlenmeyer retort and subsequently filtered and scrubbed three times in $H_2O$. The filter cake was then dried at 150 degree C. and treated in a tubular furnace for 2 hours at 250 degrees C. with $Na_2$ and for four hours with diluted $H_2$ at 250 degrees with $N2_a$. Example 2: Production of a catalytically-active substance. 39 g of $Ni(NO_3)_2*6-H_2O$ were disolved in 1.5 liter $H_2O$. 30 ml of a watery solution of $PT(NH_3)_4Cl_2*H_2O$ (solution 20 g Pt/l) and 40 g of H-Mordenite was added in a watery solution. The suspension was boiled for 48 hours in a back-flow fashion and subseqently filtered and scrubbed three times with hot water. The filter cake was dried at 150 degrees C. and then treated with $N_2$. in a tubular furnace for 2 hours at 350 degrees C.

Example 3: Production of a catalytically active substance. 30 mm of a solution of $PT(NH_3)_4)Cl_2*H_2O$ in water at a concentration of 20 g Pt/l was mixed with 17 g of acid-exchanged mordenite. The suspension was stirred for 24 hours in an Erlenmeyer retort, subsequently filtered and scrubbed three times in water. After drying at 150 C. the filter cake was calcinated in air for for 4 hours at a temperature of 300 C., subsequently the cake was reduced in diluted $H_2$ for 4 hours at a temperature of 250 C. in.

Example 4: Coating of the cordierite-honeycomb body. A zeolite calalyst prepared in accordance with example 2 above was coated, through dipping, of a cordierite honeycomb body in a watery zeolite slurry with 0.2 g zeolite per ml. Following drying, the coated carrier was calcinated for four hours at a temperature of 550 C. in a muffle-furnace. Through repetition of this coating process, 0.767 g metal-doped zeolite was fixed onto a carrier which had a weight of 17.672 g.

Example 5: Coating of the filter. A soot-filter in accordance with FIG. 2 and having a mass of 90.939 g was coated by dipping it twice in a watery slurry of a zeolite catalythic powder prepared in accordance example 2. Following dipping, the cordierite filter was dried and calcinated for four hours at a temperature of 550 C. in a muffle-furnace. Owing to the two dippings, altogether 15.64 g of the catalytically-active coating material was provided.

Example 6: Test in laboratory. A honeycomb body coated in accordance with example 4 was mounted together with an uncoated honeycomb body through a special sample-holder into the exhaust system of a Nissan petrol 3.3 Diesel engine. It was then subjected to soot-depositing for 30 minutes by exposing the engine to normal drive conditions in town and countryside. Subsequently, the honeycomb body was installed in lab equipment for determining the ignition temperature of the soot. For this purpose, a synthetically-produced exhaust gas was made to flow through the honeycomb body and having the following composition on the basis of 15/l per minute flow:

| | |
|---|---|
| Propane | 1000 vppm |
| CO | 1000 vppm |
| NO | 750 vppm |
| O2 | 5 Vol - % |
| H2O | 8 Vol. - % |
| N2 | Remainder |

During the test, the exhaust gas temperature was increased in steps while all the time, analysis of the gas composition was made both in front of and behind the honeycomb body. As shown in FIGS. 3 and 4, it could be thus demonstrated with a honeycomb body having a catalytically-active coating in accordance with example 2, a CO-conversion already obtained at 200 C.; at a temperature in excess of 300 C. there was no more CO in the exhaust gas. In contrast to the uncoated filter, which showed no soot combustion, it was clear that the coated filter showed a noticeable conversion of the soot particles. This conversion began already at a temperature of 250 C. and had a significant effect at a temperature of 350 C. At a temperature above 400 C. there was a conversion of propane NO.

Example 7: Application-technological testing. The catalytic soot-filter prepared in accordance with example 5 was loaded with 28.2 grams of synthetic soot. Following that, a lab-produced ignition temperature was determined, as well as the pressure loss in the filter. For this, the filter was flowed through by a synthetic gas mixture at the rate of 100 l/minute. This gas mixture included 10% by volume $H_2O$, 10% by volume $H_2O$ in $N_2$. In the course of time, the gas temperature was continuously increased. As can be seen in FIG. 5, soot burns off already at a temperature of 420 C. As compared with an uncoated filter, the ignition temperature of the soot could in fact be lowered by about 130 degrees C. Also, at a temperature of 430 C., the back-pressure in the filter equipment was already reduced from 2.2 bars down to 0.7 bars. Furthermore, it is noticeable that almost the entire amount of soot burned off within a very short period of time into $CO_2$. No CO could be found in the exhaust gas.

We claim:

1. Catalytically active coating of filter material for Dieselsoot filter characterized in that the coating is comprised of a zeolite having a pore diameter from 0.55 to 1.3 namometers, the zeolite being doped with a metal of the platinum group.

2. Catalytically-active coating in accordance with claim 1 characterized in that the coating is a zeolite of the mordenite group.

3. Catalytically-active coating in accordance with claim 1 characterized in that the metal is platinum.

4. Catalytically-active coating in accordance with claim 1 characterized in that the zeolite includes, in additon, a metal of the groups 1B, 2B, 5B 6B or 7B of the period system, or of a combination thereof.

5. Catalytically-active coating in accordance with claim 4 characterized in that the metal is nickel, copper, manganese, vanadium, or silver, or a combination thereof.

6. Catalytically-active coating in accordance with claim 4 characterized in that metal is nickel.

7. Catalytically-active coating in accordance with claim 5 characterized in that the atomic ratio of platinum to nickel in the zeolite is between 1:20 and 20:1.

8. Catalytic dieselsoot filter characterized in that the catalytically-active coating in accordance with claim 1 is deposited as a structural strengthener of a filter element.

9. Catalytic filter in accordance with claim 8 characterized in that the filter element is a packing of minerals of metal wool of ceramic foam of a monolithic honeycomb structure or a monolithic honeycomb structure with alternating-closed channels.

10. Catalytic filter in accordance with claim 8 characterized in that prior to applying a catalytically-active mass a coating of an inert ceramic material is provided.

11. Catalytic filter in accordance with claim 8 characterized in that the catalytically active coating is simultaneously added on with an inert oxide material of aluminium, titanium, zirconium, or silicon or of a combination thereof.

* * * * *